United States

Adicoff et al.

[11] 3,928,108

[5] Dec. 23, 1975

[54] METHOD OF MAKING A POLY(METHYL METHACRYLATE) PRE-HOLOGRAPHIC ELEMENT

[75] Inventors: Arnold Adicoff; Warren J. Murbach, both of China Lake, Calif.

[73] Assignee: The United States of America as represented by the Secretary of the Navy, Washington, D.C.

[22] Filed: Aug. 12, 1974

[21] Appl. No.: 496,419

[52] U.S. Cl. ............... 156/246; 96/27 H; 156/307; 156/336; 427/339; 427/415; 427/414; 428/475; 428/913
[51] Int. Cl.² ............... B32B 31/12; B32B 31/24; B32B 23/08; G03C 5/00
[58] Field of Search............ 96/27 H, 90 R; 117/3.5, 117/34, 62.1, 62.2, 81, 82; 156/83, 230, 246, 307, 319, 336; 161/228, 403, 410; 260/220, 222, 223; 427/149, 339, 414, 415; 428/475, 913

[56] References Cited
UNITED STATES PATENTS

| | | |
|---|---|---|
| 2,276,151 | 3/1942 | Brandenberger ............... 161/228 X |
| 2,471,583 | 5/1949 | Reeves et al.......................... 260/223 |
| 2,606,130 | 8/1952 | Alexewicz et al................ 117/3.5 X |
| 3,178,287 | 4/1965 | Sweet et al........................... 96/84 R |
| 3,402,087 | 9/1968 | Yackel et al......................... 156/246 |
| 3,833,383 | 9/1974 | Ryan et al........................... 96/84 R |

*Primary Examiner*—Douglas J. Drummond
*Assistant Examiner*—John J. Gallagher
*Attorney, Agent, or Firm*—R. S. Sciascia; Roy Miller; Lloyd E. K. Pohl

[57] ABSTRACT

Methods for manufacturing pre-holographic elements are disclosed. The methods comprise the steps of providing a poly(methyl methacrylate) base, coating the base with a nitrocellulose-containing coating composition, denitrating the coating composition, covering the coated base with water, placing a pre-hardened gelatin film under the water near the coating on the base and removing the water from between the coating and the pre-hardened gelatin film.

5 Claims, No Drawings

METHOD OF MAKING A POLY(METHYL METHACRYLATE) PRE-HOLOGRAPHIC ELEMENT

BACKGROUND OF THE INVENTION

1. Field of the Invention

This invention relates to methods for manufacturing preholographic elements. More specifically, this invention relates to methods for manufacturing pre-holographic elements in which the bases of the elements are fabricated from poly(methyl methacrylate). The general expression poly(methyl methacrylate) is used in this specification to include articles that are water-white and transparent, articles which contain a wide variety of integral dyes and pigments and articles which may be pre-shrunk, craze-resistant, ultraviolet absorbing and transmitting or any combination thereof. These may include formulations which incorporate small amounts of vinyl acetate and crosslinking agents such as those manufactured for certain heat setting properties.

2. Description of the Prior Art

Holographic optical elements are well known. A typical holographic element comprises a base and a layer of material — usually a gelatin layer — which has been sensitized, exposed to a laser beam or intense light source and developed. One common use for holographic elements is in military target acquisition. In conjunction with target acquisition, a holographic element often forms part of the visor of a flight helmet.

Poly(methyl methacrylate), since it is an excellent material from which to form flight helmet visors, is attractive for use as base material for holographic elements. However poly(methyl methacrylate) — better known as Plexiglas — is highly hydrophobic. Since the gelatin layer commonly used in a holographic element is highly hydrophilic, one or more intermediate layers (commonly called "subbing" layers) must be used to affix the gelatin layer to the base layer. In the prior art, Plexiglas has simply not found use as a holographic base material because suitable materials for use in subbing layers have not been known.

SUMMARY OF THE INVENTION

According to this invention a poly(methyl methacrylate) base is coated with a 2 weight percent nitrocellulose — 98 weight percent 2-methoxyethanol coating composition, the coating is dried, the coating is denitrated, the coating is covered with water, a pre-hardened gelatin layer is placed under the water near the coating and water is removed from between the pre-hardened gelatin layer and the coating allowing the two to contact each other whereupon the gelatin layer becomes affixed. By using the techniques of this invention, pre-holographic elements can be formed using the concave side of a spherical or toroidal surface such as the inner surface of a flight helmet visor, the convex side of such a surface or a flat surface as the pre-holographic element base. Once a pre-holographic element is fabricated, it can be treated with dichromate compounds in any way well known in the art to render it light sensitive, exposed to a laser beam or other suitable light source and developed. It then becomes a holographic optical element.

DESCRIPTION OF THE PREFERRED EMBODIMENTS

A detailed description of this invention will be made using a poly (methyl methacrylate) visor for an aircraft flight helmet as an example of a base to which the gelatin layer of a pre-holographic element is affixed. The visor of a flight helmet has a toroidal surface. However, it will be realized by those skilled in the art that objects with either spherical surfaces or flat surfaces could be used in lieu of toroidal flight helmet visors.

EXAMPLE 1

The concave (inner) side of a poly(methyl methacrylate) flight helmet visor was coated with a coating composition containing 2 weight percent nitrocellulose and 98 weight percent 2-methoxyethanol. The nitrocellulose was a high viscosity type made from purified cotton linters, had a nitrogen content of 12.60% and a steel-ball viscosity of 20 to 30 seconds. The coating was applied by forming a pool approximately 4 inches in diameter on the inner, concave surface of the visor, allowing the pool to remain there for 2 minutes, quickly decanting and allowing the surface to drain and dry, in air, for 4 hours. Drying was accomplished in an atmosphere wherein the dewpoint was sufficiently low to avoid blushing or precipitation of polymer by absorption of atmospheric moisture. On drying, a clear film was obtained.

The nitrocellulose coating was denitrated by immersing the coated visor in a stirred bath made up of 50 volume percent ammonium sulfide (21.0%) and 50 volume percent ethanol (100%). Immersion was continued for 1 hour. The base, now coated with regenerated cellulose, was then removed from the denitrating bath and thoroughly washed with distilled water. The coating was kept wet until a pre-formed and pre-hardened gelatin layer was applied in subsequent steps. However, the coating may be allowed to dry after the denitration and washing procedures are carried out.

A pre-formed, pre-hardened gelatin layer was prepared by coating a temporary poly(methyl methacrylate) support on one side with a gelatin solution of the following composition:

| INGREDIENT | GRAM |
| --- | --- |
| Gelatin | 4.0 |
| Distilled Water | 96.0 |
| Ammonium Dichromate (0.9 wt%) | 0.036 |

The solution was heated to 50°C, filtered and the cooled filtrate wiped across the surface of the support with a doctor blade set to a height of 0.031 inch. The coating was dried in the absence of light, cut to an appropriate size with a circular punch or a scalpel, released from the temporary support by applying a few drops of isopropanol at each cut and then hardened by means of exposure to ambient light for 4 hours.

Thus, pre-formed, pre-hardened gelatin film was transferred to the concave coated surface of the visor by carrying out the following steps:

1. The coated surface of the visor was covered with distilled water.
2. The gelatin film was immersed in the water, allowed to swell for 10 minutes and manipulated to near the coated base with a glass stirring rod. The swollen gelatin film and coated base were then brought into contact by simultaneously removing them from the water. The gelatin film was then quickly centered over the coated area and allowed to dry in air.

Upon drying, the pre-holographic element was sensitized with a dichromate compound, exposed to radiation from an argon-ion laser and developed, under standard holographic conditions, to a holographic optical element with good imaging characteristics. The element showed no tendency to contract and shrink back at the edge, so-called "skidding," and no dry edge lifting even after storage for several months.

The procedure described above yields a dry gelatin film having a thickness of approximately 12 micrometers. The film thickness can be varied by changing either the spacing of the doctor blade or the concentration of the gelatin solution on the temporary substrate since the thickness is directly proportional to both parameters.

In a modification of the process there is incorporated into the film, instead of the stated concentration of ammonium dichromate to preharden the gelatin layer, any concentration of ammonium dichromate between 0.7 and 0.9 weight percent, based on the weight of dry gelatin, with generally similar results.

In another variation, ultraviolet radiation from a low pressure mercury lamp may be used to harden the gelatin film.

EXAMPLE 2

To affix a gelatin film to the convex surface of a spherical or toroidal base or to a flat surface one can immerse a convex surface in the coating composition for 2 minutes, remove the base from the composition and proceed as described in Example 1.

What is claimed is:

1. A method for manufacturing a pre-holographic element comprising the steps of:
   a. providing a poly (methyl methacrylate) base;
   b. coating the base with a coating composition made up of 2 weight percent nitrocellulose and 98 weight percent 2-methoxyethanol;
   c. drying the coating
   d. denitrating the coating by immersing it in a stirred bath of a denitrating composition made up of 50 volume percent ammonium sulfide and 50 volume percent ethanol for 1 hour to form regenerated cellulose;
   e. covering the coated base with water;
   f. placing a pre-hardened gelatin film under the water near the coated base; and
   g. removing the water from between the coated base and the gelatin film allowing the gelatin film to contact the coating.

2. The method according to claim 1 wherein the coating is dried for at least 4 hours before the denitrating step is performed.

3. The method according to claim 2 wherein the denitrating step is carried out for at least 1 hour.

4. The method according to claim 3 wherein the base is selected from the group consisting of poly(methyl methacrylate) objects having spheroidal surfaces and poly (methyl methacrylate) objects having toroidal surfaces.

5. The method according to claim 3 wherein the base is selected from the group consisting of polymethyl methacrylate) objects having flat surfaces.

* * * * *